US009501521B2

(12) United States Patent
Barykin et al.

(10) Patent No.: US 9,501,521 B2
(45) Date of Patent: Nov. 22, 2016

(54) SYSTEMS AND METHODS FOR DETECTING MISSING DATA IN QUERY RESULTS

(71) Applicant: Facebook, Inc., Menlo Park, CA (US)

(72) Inventors: Oleksandr Barykin, Sunnyvale, CA (US); Josh Metzler, Redwood Shores, CA (US)

(73) Assignee: Facebook, Inc., Menlo Park, CA (US)

( * ) Notice: Subject to any disclaimer, the term of this patent is extended or adjusted under 35 U.S.C. 154(b) by 209 days.

(21) Appl. No.: 13/951,438

(22) Filed: Jul. 25, 2013

(65) Prior Publication Data
US 2015/0032726 A1  Jan. 29, 2015

(51) Int. Cl.
*G06F 17/30* (2006.01)

(52) U.S. Cl.
CPC .............................. *G06F 17/30424* (2013.01)

(58) Field of Classification Search
CPC .................. G06F 17/30864; G06F 17/30489; G06F 17/30536; G06F 17/30575; G06F 11/3692; G06F 11/3452; G06F 11/3476; G06F 11/3672; H04L 67/22
USPC ............ 707/706, 610, 722; 714/25; 717/124
See application file for complete search history.

(56) References Cited

U.S. PATENT DOCUMENTS

| 6,138,112 | A  | * | 10/2000 | Slutz ............................. 707/748 |
| 7,904,440 | B2 | * | 3/2011  | Anderson et al. ............ 707/706 |
| 2005/0033759 | A1 | * | 2/2005  | Chaudhuri et al. ........... 707/100 |
| 2007/0214133 | A1 | * | 9/2007  | Liberty et al. .................... 707/5 |
| 2008/0027961 | A1 | * | 1/2008  | Arlitt ................. G06F 11/3452 |
| 2009/0055357 | A1 | * | 2/2009  | Richardson ......... G06F 17/3051 |
| 2009/0192997 | A1 | * | 7/2009  | Fujiwara et al. ................ 707/3 |
| 2011/0035399 | A1 | * | 2/2011  | Deng et al. ................... 707/768 |
| 2011/0276396 | A1 | * | 11/2011 | Rathod ...................... 705/14.49 |
| 2012/0254776 | A1 | * | 10/2012 | Corella et al. ................ 715/760 |
| 2013/0117609 | A1 | * | 5/2013  | Dande et al. .................... 714/32 |
| 2014/0195478 | A1 | * | 7/2014  | Leff et al. ...................... 707/610 |
| 2014/0289268 | A1 | * | 9/2014  | Patil et al. ..................... 707/765 |

\* cited by examiner

*Primary Examiner* — Dennis Truong
(74) *Attorney, Agent, or Firm* — Sheppard Mullin Richter & Hampton LLP

(57) ABSTRACT

Techniques provided herein allow for estimating data missing in query results provided in response to queries performed on data managed by a data management system. In the event that one or more leaf nodes are unable or unavailable to process a query, a final query result provided in response to the original query may be missing data that exists on those leaf nodes. A data accounting service monitors what managed data is being stored on the leaf nodes and on what leaf node. The data accounting service can estimate how much data is missing from a final query result when one or more of the leaf nodes are unable or unavailable to process a query.

17 Claims, 8 Drawing Sheets

US 9,501,521 B2

SYSTEMS AND METHODS FOR DETECTING MISSING DATA IN QUERY RESULTS

FIELD OF THE INVENTION

The present application relates to data queries and, in particular, estimating missing data in query results.

BACKGROUND

Social networks have revolutionized electronic communications by providing users with interactive ways to communicate and connect with one another. Users of social networks can, for instance, exchange electronic messages and create relationships with each other or with particular communities in the social network. Some social networks also provide public and private message boards for users to express ideas and share images, video, and interactive content. Due to the popularity of these and other features, a significant portion of humanity maintains membership with some form of social network.

Routine usage of a social network can result in the generation of large volumes of data relating to that usage, including log data regarding user activity on a social network or relating to various systems that provide or support the social network. Data generated by social networks can include data relating to how various segments (e.g., features) of a social network are performing, data relating to how various systems that support the social network are performing; data relating to trends in content generated or accessed by users, behavioral data regarding users, and the like. These and other types of data can be useful in performing analytics on the social network.

Due to its storage footprint and rate of generation, managing and querying data generated by a social network can prove to be a difficult task for operators of the underlying system. For example, quality assurance teams and product development teams may find it difficult to analyze data relating to usage of newly deployed or longstanding social network features. Likewise, as another example, those teams may encounter difficulties in assessing the performance of various system components that support those features.

SUMMARY

Techniques provided herein allow for estimating data missing in query results provided in response to queries performed on data managed by a data management system, such as a database system. In some embodiments, the data management system may be configured to receive data for management, split the data into portions, and store the portions at one or more leaf nodes (e.g., individual servers). When a query is received for processing by the data management system, one or more of the leaf nodes receives a corresponding (leaf-level) query for processing on the managed data they respectively store. Query results received from the leaf nodes are combined into a final query result provided in response to the original query. However, in the event that one or more of those leaf nodes are unable or unavailable to process the query (e.g., offline or extremely busy), the final query result provided in response to the original query may be missing data that exists on those leaf nodes that are unable or unavailable. The systems and methods described herein can implement a data accounting service that monitors what managed data is being stored on the leaf nodes and on what leaf node. By way of this data accounting service, the systems and methods can estimate how much data is missing from a final query result when one or more of the leaf nodes are unable or unavailable to process a query.

In some embodiments, systems and methods can receive a data set for storage, store a data subset of the data set at at least one leaf node in a plurality of leaf nodes, and store data accounting information regarding the storage of the data subset at the at least one leaf node. Thereafter, an initial query, configured to be performed on the data set, may be received. A first query, based on the initial query, may be submitted to one or more of the plurality of leaf nodes. The first query may be configured such that it can be performed on data respectively stored at the one or more of the plurality of leaf nodes. The first query may be identical to the initial query, or may be a modified version of the initial query configured to be processed by the plurality of leaf nodes. Additionally, a second query, based on the initial query, may be performed on the data accounting information. Eventually, a first result, received in response to the first query, may be compared to a second result, received in response to the second query, in order to determine whether the first result is missing data. In this way, systems and methods can determine whether data is missing in the first result based on the expectation of what data should be in the first result, in view of the data accounting information.

In some embodiments, the first result may include one or more query results received from the one or more of the plurality of leaf nodes.

In some embodiments, the data accounting information may comprise storage information generated by the at least one leaf node. For example, in regard to the data subset being stored, the storage information may describe what data elements from the data subset are being stored to the plurality of leaf nodes and may describe what leaf nodes store what data elements. Depending on the embodiment, the storage information may be generated by the one or more leaf nodes storing the data elements from the data subset, or the storage information may be generated by a computer system receiving the data set for storage and providing it to the plurality of the leaf nodes.

In some embodiments, storing the data accounting information may comprise storing the data accounting information at one or more data accounting nodes that are separate from the plurality of leaf nodes. In some embodiments, performing the second query on the data accounting information may comprise submitting the second query to the data accounting nodes, and receiving the second result from the data accounting nodes. In some embodiments, at least a portion of the data accounting nodes may be synchronized.

In some embodiments, the data accounting information may comprise one or more identifiers for the data subset stored at the at least one leaf node. The data accounting information may further comprise one or more identifiers for the at least one leaf node, an identifier for a table associated with a data element of the data subset, or a timestamp associated with a data element of the data subset.

In some embodiments, the second result may be received in response to the second query being performed on the data accounting information.

In some embodiments, the second result may comprise information regarding an amount of data to be expected in the first result.

In some embodiments, the initial query comprises structured query language (SQL).

In some embodiments, the systems and methods may determine, by the comparison, an amount of data missing in the first result. In some embodiments, the determined amount may be an estimate. In some embodiments, the determined amount may be precisely determined. In some embodiments, the determined amount may be represented by a value that reflects the amount of data missing in the first result. For example, the value may reflect the number of data elements missing. In another example, the value may reflect the percentage of data elements missing in the first result or, conversely, the percentage of data elements provided in the first result in view of what was expected as the first result.

In some embodiments, the data set may comprise log data. The log data may be associated with operation of a social networking system. The log data may comprise one or more time-stamped data elements regarding user activity occurring on the social networking system.

Many other features and embodiments of the invention will be apparent from the accompanying drawings and from the following detailed description.

Figure 1:
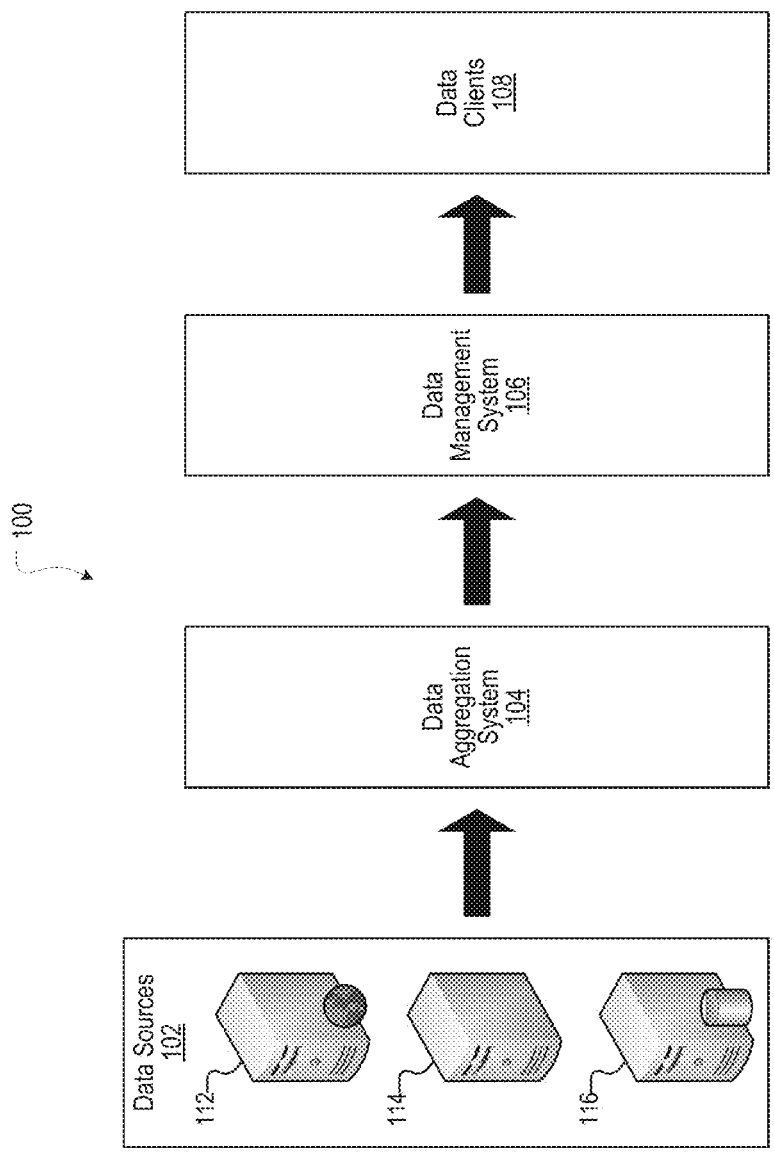
FIG. 1 illustrates an example of a data processing system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

A social networking system may include a complex web of interdependent subsystems. Problems in any of these subsystems may cause issues that can propagate through the social networking system. As an example, problems in a web server may cause problems elsewhere in the social networking system. To help operators identify problems and monitor the state of the social networking system, persistent event processing systems may be employed. The persistent event processing systems may use hard-drives to store event logs of events that occur on the social networking system. Operators seeking to understand the events may query the hard-drives for information, such as performance or user interaction metrics, that are likely linked to the events. Only after evaluating the information on the hard-drives may operators conduct an analysis of the root cause of an event.

However, the process of writing to and querying hard-drives may take hours or even days. Operators may not have access to information about events soon after the events occur. As a result, social networking systems with persistent event processing systems may not have sufficiently low latency to ensure effective operation. Social networking systems with persistent event processing systems also may not provide sufficiently responsive tools for operators. That is, operators may not be able to evaluate the behavior of users of a social networking system or user interactions with the social networking system in a timely manner.

Accordingly, social networking systems may employ in-memory event processing systems capable of receiving, processing, and querying event log data with low latency and sufficient responsiveness, thereby ensuring proper and efficient operation of the social networking systems. Such in-memory event processing systems can import and query data that is critical for real-time (or near real-time) performance and data analysis relating to the social networking systems. The in-memory event processing systems can provide for real-time, interactive, or ad-hoc analysis of event log data, which can be based on queries. The in-memory event processing system can, for example, query hundreds of gigabytes of event log data for events that occurred on the social networking system moments ago. Analysis by in-memory event processing systems can be useful in code regression analysis, bug report monitoring, ads revenue monitoring, performance debugging, or other operational aspects of social networking systems. The systems and methods described herein can be used to optimize management of stored data in such in-memory event processing systems and other data processing systems.

FIG. 1 illustrates an example of a data processing system 100 in accordance with an embodiment of the invention. In FIG. 1, the data processing system 100 is depicted as including multiple data sources 102, a data aggregation system 104, a data management system 106, and data clients 108. In an embodiment of the invention, the data processing system 100 may include additional, fewer, or different components for various applications. In accordance with some embodiments, the data processing system 100 can be configured such that data sources 102 provide data for processing, the data aggregation system 104 aggregates the data, the data management system 106 stores the aggregated data and provides the stored data, or related information, to one or more data clients 108. By such a configuration, the data processing system 100 can enable a social networking system (or other system) to quickly aggregate, store, and query massive amounts of event log data, generated by various components of the social networking system. By doing so, the data processing system 100 can provide operators of the social networking system with real-time or near real-time analytics regarding the operation of the social networking system, which can be useful in code regression analysis, bug report monitoring, ads revenue monitoring, performance debugging, and other operations related areas.

Event log data can, for example, relate to performance events, such as how hardware or software of a social networking system is performing. Performance events can include metrics such as processing load, numbers of cache requests, network throughput, or other metrics. Rapidly providing information about performance events may prove relevant for members of quality assurance teams, such as site performance teams, who are interested in how hardware or software configurations of the social networking system are performing. Performance events can also include error reports related to problems in one or more of the modules that make up the social networking system.

Event log data can include measures of how users interact with the social networking system. Accordingly, for some embodiments, the data processing system 100 may collect and subsequently provide information about user events, such as how users interact with information on the social networking system. Examples of user events can include information about data trends, words in users' posts, surges in word frequencies, demographic information (e.g., users' countries, ages, genders, etc.) of users posting content to the social networking system, etc.

Event log data can include information about behavioral events on the social networking system. Behavioral events may include information relating to how different users of a social networking system respond to changes in a web or mobile platform associated with the social networking system. Examples of behavioral events can include information about usage patterns, such as user locations or ages, product parameters (e.g., devices, operating systems, etc.), or keywords in bug reports. Examples of behavioral events can further include usage of a mobile application associated with the social networking system, interactions of users with the social networking system with advertisements, interactions of users with a new page or feature provided by the social networking system, or any other activity that may be influenced by a change to the social networking system.

According to some embodiments, the data sources 102 provide data relating to one or more events on the social networking system. For illustrative purposes, FIG. 1 depicts the data sources 102 as including a web server 112, a backend data server 114, and a database server 116. The data sources 102 may include any type of computer system that provides data, such as event log data. The data sources 102 may also include devices that allow social networking system users to access portions of web servers or backend server systems.

In some embodiments, the data sources 102 may provide log entries that represent events. Each log entry may be based on one or more logging calls implemented and executed by the data sources 102. Each log entry may have a standard format, which can eventually be aggregated by the data aggregation system 104.

In various embodiments, each log entry may include at least one field that provides a unique or semi-unique identifier for the log entry. In some embodiments, a timestamp, such as a UNIX timestamp, may serve as the identifier of each log entry provided by the data sources 102. Use of a timestamp to identify log entries may allow the data sources 102 and the other components of the data processing system 100 to efficiently capture information about time-varying phenomena.

A log entry from the data sources 102 may have a standardized data format to describe events occurring in the social networking system. In some embodiments, the standardized data format may include an integer field, a string field, a string set field that contains unordered strings, and a string vector field that contains ordered sets of strings. The integer field may, for example, include information used for aggregations, comparisons, and groupings. The integer field may also include a timestamp of an event. In various embodiments, a timestamp portion of a log entry, such as a UNIX timestamp, in the integers field may be required for the log entry to be considered by the data processing system 100. Accordingly, the timestamp portion may be taken as, or considered, an index of a given row of log data provided by the data sources 102. It is noted that use of the timestamp field to identify log entries may be useful in identify and analyze time-varying phenomena.

The string field of the standardized data format may include character strings, information for performing comparisons and groupings of text, ordered or unordered sets of strings, and information for representing words in a post on a social networking system. As just one example, the string set field may also include information for representing sets of features (e.g., a graph search, a news feed redesign, etc.) that are enabled for a given user of the social networking system. The string vector field of the standardized data format can also include ordered sets of character strings, and information for performing stack traces in the social networking system. In some embodiments, the order of data in the string vector field may correspond to a level of a stack trace in the social networking system.

In various embodiments, the standardized data format may comprise a table, where the first column of the table may include integer fields populated with UNIX timestamps of events being logged in the social networking system. Other columns of the table may include populated integer fields, string fields, string set fields, and string vector fields. For some embodiments, each of the populated fields may be indexed by the UNIX timestamp of the first column of the table. Additionally, for some embodiments, each row of the table may describe an event on a social networking system.

It is noted that the standardized data format may support other types of fields without departing from the scope and substance of the inventive concepts described herein. It is also noted that the standardized data format need not support various data types, such as floating numbers, that may take large amounts of memory to store. In some embodiments, other data types, such as floating number types, may be represented as one of the fields of the standardized data format. For instance, the integer field may be used to represent other data types, such as floating number types.

The data aggregation system 104 may be configured to aggregate log data, or other types of data, received from the data sources 102. According to some embodiments, the data aggregation system 104 may be configured to collect data from the data sources 102, aggregate the data, and deliver the aggregated data to the data management system 106. As described herein, one or more logging calls implemented and executed by the data sources 102 can result in log data being written to the data aggregation system 104. Further, the data aggregation system 104 may be configured to deliver log data to the data management system 106 in batches. Each batch delivered by the data aggregation system 104 may contain rows of log data, where each row may comprise a log entry, where each row may be identified by a timestamp (e.g., UNIX timestamp), and where the rows comprise data relating to different types of events. According to some embodiments, rows in the batch may have different schema and, as such, may include a description of their schema. Upon receiving a batch of data rows, the data management system 106 can use included schema descriptions to appropriately process the rows (e.g., appropriately store the rows to enable future retrieval or querying).

Depending on the embodiment, the log data aggregated by the data aggregation system 104 and delivered to the data management system 106 may be a sample set of log data (i.e., log data subset) derived from a larger set of log data (i.e., log data set). Such a sample set of log data may be derived such that the sample set is representative of the log data contained in the larger set of log data. Additionally, depending on the embodiment, the creation of the sample set of log data may take place at the data sources 102, the data aggregation system 104, or the data management system 106, and may involve one or more of the data sources 102, the data aggregation system 104, and the data management system 106 performing a sampling process. For some embodiments, the sampling of data may be based on or vary according to the type of data. For instance, the rate of sampling used to create a sample set of event log data, from a larger set of event log data, may vary based on the event type associated with such event log data.

The data management system 106 may be configured to receive and process log data aggregated by the data aggregation system 104. Processing the data can involve the data management system 106 managing the storage of the aggregated log data and retrieval of the stored log data. Additionally, processing the data can also involve the data management system 106 performing queries on the stored log data and providing stored log data based on such queries. As described herein, the log data may be received by the data management system 106 from the data aggregation system 104 in batches including rows of data (e.g., log data entries). As also described here, particularly with respect to FIG. 2, the queries may be originate from data clients 108 accessing the data management system 106, whereby the data clients 108 may access the data management system 106 through interfaces provided to the data clients 108 by the data management system 106. More regarding this is discussed with respect to FIG. 2.

For each batch of incoming data rows, the data management system 106 can select one or more nodes (also referred to herein as "leaf nodes") and send some or all of the data rows to the selected leaf nodes for storage. For some embodiments, the data management system 106 may select one or more leaf nodes based on their respective availability, particularly with respect to storage (e.g., availability of primary memory space), processing, or some other computing resource. For some embodiments, the data management system 106 may select one or more leaf nodes at random. As a result, in some embodiments, the data management system 106 may receive a data table in one or more batches and distribute storage of the data table rows by striping the data table rows across two or more leaf nodes. As described herein, where the data table row is a row of log data, a timestamp associated with each log entry can be used as a row identifier, particularly when the data table row is stored at a leaf node. It should be noted that in some embodiments, an identifier for a data table row stored at a leaf node can include a combination of fields in the data table row, where the combination may or may not include a timestamp.

Figure 7:
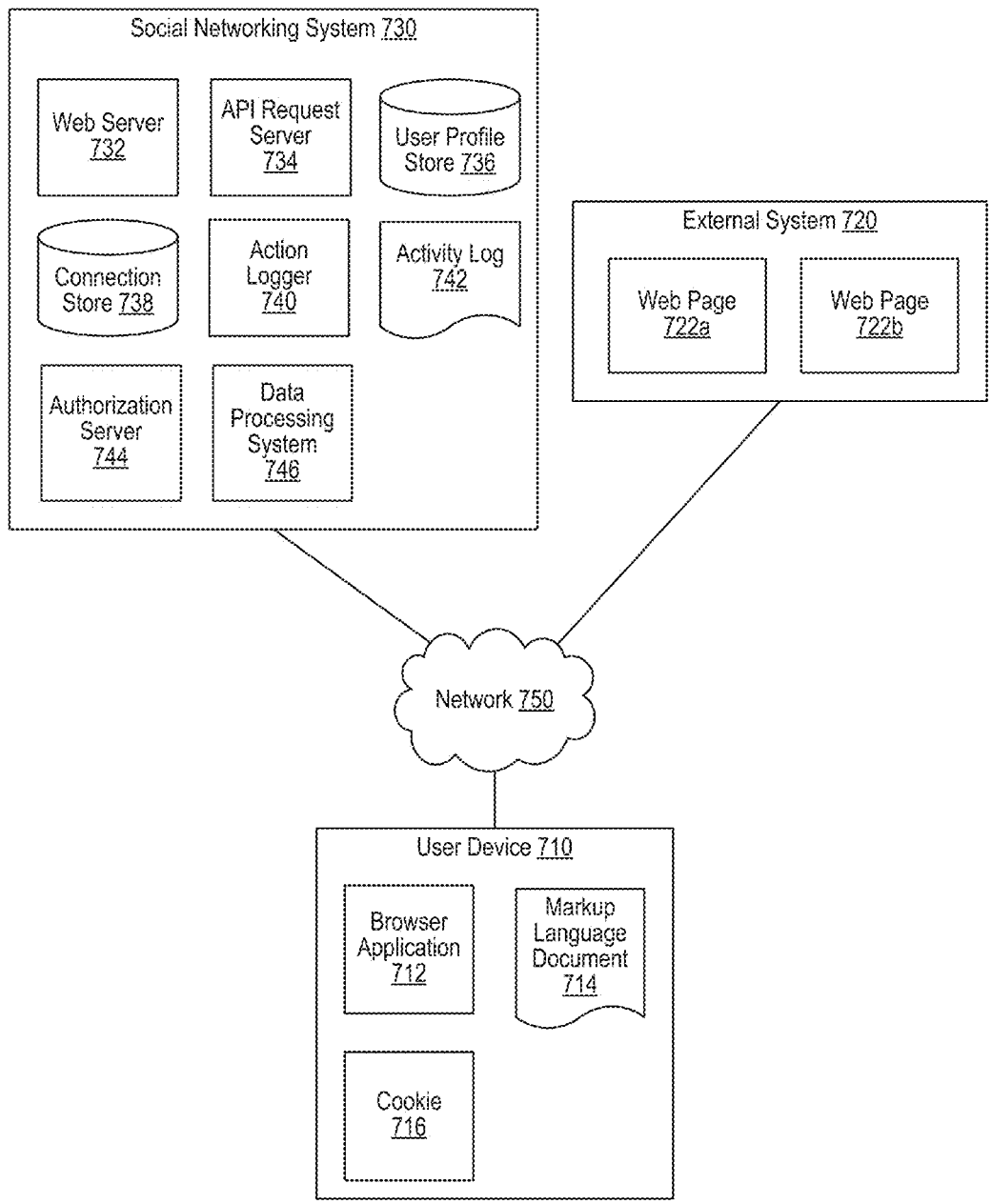
FIG. 7 illustrates an example of a network diagram of system for detecting or estimating missing data in query results in a social networking system in accordance with an embodiment of the invention.

As used herein, a leaf node may be implemented using an independent computer system similar in architecture to the computer system 700 of FIG. 7. More regarding the computer system 700 is discussed herein with respect to FIG. 7. Depending on the embodiment, each of the leaf nodes may implement, or be part of, an in-memory database system configured to store data in primary memory (e.g., random access memory) and perform queries on data residing in primary memory, thereby facilitating fast retrieval of stored data based on queries. With a plurality of such leaf nodes, a large number of data tables (e.g., thousands) comprising a large storage footprint (e.g., gigabytes or terabytes) can quickly be scanned when processing a query and returning a query result. More regarding leaf nodes is discussed herein with respect to FIG. 2.

According to various embodiments, the data management system 106 may employ systems and methods described herein for detecting or estimating missing data in query results generated in response queries performed on data (e.g., log data) being managed by the data management system 106 and being stored by the data management system 106 at the one or more leaf nodes. The systems and methods described herein may be useful for database systems, such as in-memory database systems and alternatives where the data rows for data tables are distributively stored across a plurality of leaf nodes. For such database systems, when some leaf nodes are unable or unavailable to process a query (e.g., offline for maintenance or extremely busy), there is a possibility that the query result returned contains less data rows than would otherwise be provided if more or all of the leafs nodes were able or available to process the query. The system and methods described herein may estimate or otherwise detect when query results provided by the leaf nodes may omit relevant information when less than all the leaf nodes are available. For some embodiments, the data management system 106 may manage event log data generated by a social networking system and its various components.

For some embodiments, the data management system 106 may provide the missing data detection or estimation service by accounting for (e.g., tracking) what data elements are stored on the leaf nodes and accounting for (e.g., tracking) what data elements each of the leaf nodes is storing. For example, the data management system 106 may receive, for storage, a data table CRITICAL_EVENTS including 10 data rows of log entries associated with logged critical events. The data management system 106 may distributively store the data table CRITICAL_EVENTS at the leaf nodes such that 3 data rows are stored at a first leaf node of a plurality of leaf nodes, 2 data rows are stored at a second leaf node of the plurality, 1 data row is stored at a third leaf node of the plurality, and the remainder of the data rows are stored at a fourth leaf node of the plurality. The plurality of leaf nodes may or may not have more than 4 leaf nodes.

The data management system 106 may additionally store data accounting information that describes that 3 data rows were stored at the first leaf node, 2 data rows were stored at the second leaf node, 1 data row was stored at the third leaf node, and 4 data rows were stored at the fourth leaf node. The data accounting information may also identify those data rows. Subsequently, when a query is submitted to the plurality of leaf nodes, those available and able to respond may individually do so. Once the results from the responding leaf nodes are aggregated into a final result, the data accounting information previously stored can be used to detect or estimate data rows missing from the final result. As described herein, the data accounting information can, in this way, provide query result expectations. Depending on the embodiment, the data management system 106 may manage event log data generated by a social networking system and its various components.

The data clients 108 may be configured to access data managed by the data management system 106. In particular embodiments, the data clients 108 may access one or more data interfaces provided by the data management system 106 that provide access to the data managed by the data management system 106. Such a data interface may, in some embodiments, permit a user at a data client to submit, to the data management system 106, one or more data queries (e.g., database queries) in connection with the managed data and receive in response one or more results for the queries. The data management system 106, upon receiving a given data query, may query one or more of the leaf nodes, which store the manage data, based on the given data query. Upon receiving and aggregating the query results provided by the leaf nodes, the data management system 106 may provide to the requesting data client a result based on the aggregated results (e.g., a result comprising a composite of the leaf node results). Depending on the embodiments, when querying the leaf nodes, the data management system 106 may query all available leaf nodes for results, regardless of whether a leaf node is storing data relevant to the current query. Additionally, depending on the embodiment, the query sent to the leaf nodes by the data management system 106 may be based on but not identical to the query received from a data client. For example, the data management system 106 may receive a database query from a data client 108 and convert the received database query to a query compatible with the leaf nodes storing the managed data. For instance, the data management system 106 may receive a query comprising Structured Query Language (SQL) and convert the received to a corresponding query comprising SQL different from the received query. This may be the case where the data management system 106 must account for how data is stored at the leaf nodes.

It should be understood that in various embodiments, the systems and methods described herein can process data that differs from log data in type, format, or content. For instance, certain systems and methods may process data from database tables or data received through a data stream. It should also be understood that in the data processing system 100, the data flow is not restricted to arrows depicted. For some embodiments, the data sources 102, the data aggregation system 104, the data management system 106, and/or the data clients 108 may communicate bi-directionally with one another during operations of the data processing system 100.

Figure 2:
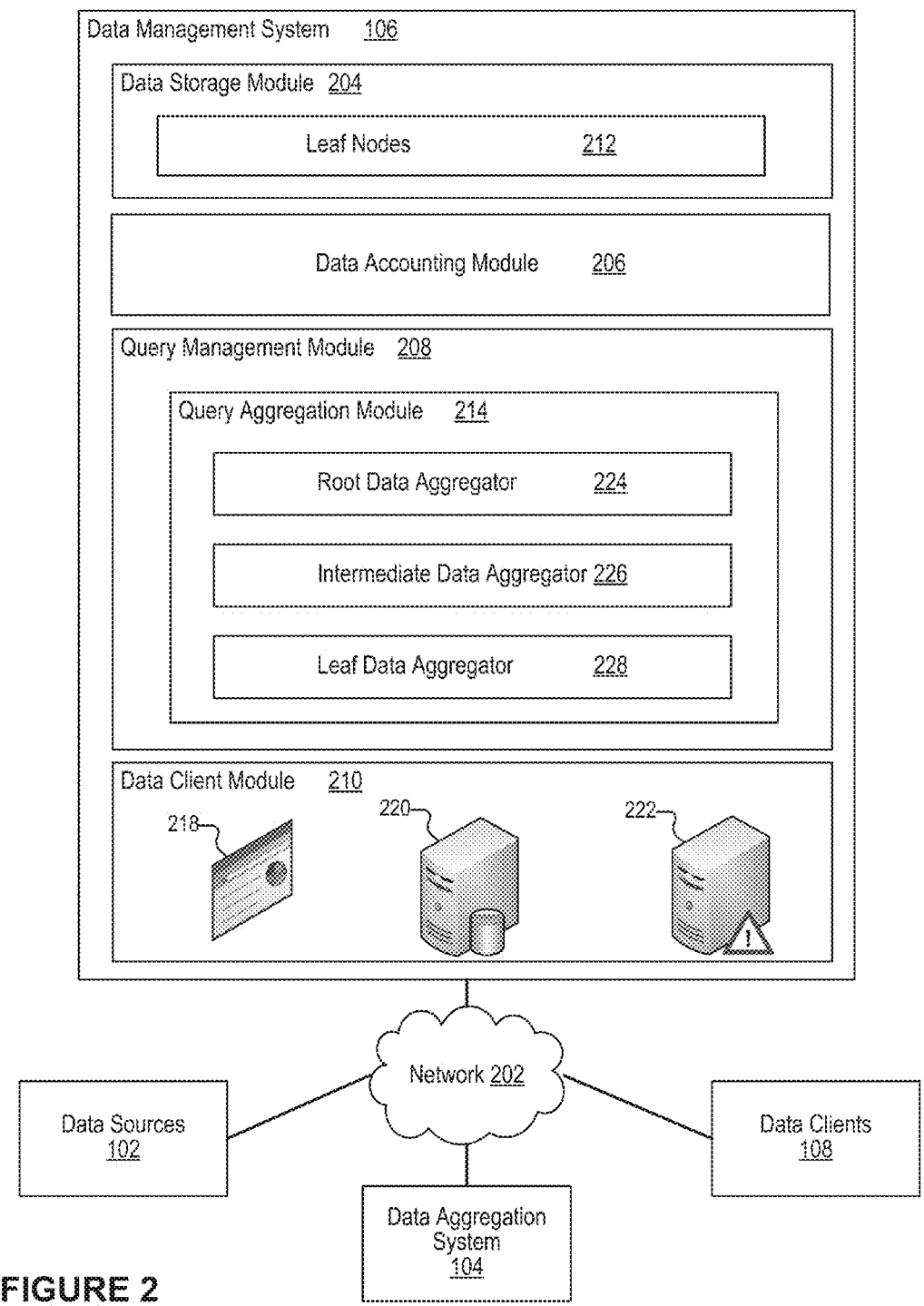
FIG. 2 illustrates an example data management system in accordance with an embodiment of the invention.

FIG. 2 illustrates data management system 106 in accordance with an embodiment of the invention. As described herein, the data management system 106 can be configured to manage data stored on leaf nodes, which can include querying data stored on leaf nodes and detecting or estimating data missing in query results. For illustrative purposes, FIG. 2 depicts the embodiment of the data management system 106 as communicatively coupled with the data sources 102, the data aggregation system 104, and the data clients 108 through a network 202, thereby permitting data communication among these entities. For example, through the network 202, one or more data sources 102 can provide log data to the data aggregation system 104, the data aggregation system 104 can provide aggregated log data to the data management system 106, and the data management system 106 can provide one or more data clients 108 with access to data being managed by the data management system 106. FIG. 2 also depicts the embodiments of the data management system 106 as including a data storage module 204, a data accounting module 206, a query management module 208, and a data client module 210. In an embodiment of the invention, the data management system 106 may include additional, fewer, or different components for various applications, as discussed in more detail below. Other components are not shown so as to not obscure relevant details.

The data storage module 204 includes one or more leaf nodes 212, each of which may be configured to store data (e.g., log data) managed by the data management system 106. As described herein, the leaf nodes 212 may implement an in-memory data store system, such as an in-memory database system, which can benefit from various systems and methods described herein for retaining and removing data. According to some embodiments, the leaf nodes 212 are configured into clusters of leaf nodes. Through the data storage module 204, data being managed by the data management system 106 can distribute storage of data to two or more leaf nodes 212. For example, the data storage module 204 can receive a data table for storage and distribute storage of the data table by striping the data table rows across two or more of the leaf nodes 212.

The data storage module 204 may be configured to monitor various aspects of the operation of the leaf nodes 212. Examples of these aspects can include whether leaf nodes 212 are online, whether leaf nodes 212 are available for access, the availability of computing resources at the leaf nodes 212 (e.g., primary memory availability, computing load), and whether leaf nodes 212 are operating in accordance within constraints (e.g., as defined by a data retention policy). Monitoring these and other aspects of the leaf nodes 212 can be useful for selecting one or more leaf nodes 212 for storage of new data, detecting when data removal is required at one or more leaf nodes 212, and submitting data queries to one or more leaf nodes 212. In some embodiments, the data management system 106, and the data storage module 204 in particular, can communicate with the leaf nodes 212 through the network 202.

The data accounting module 206 may be configured to estimate or otherwise detect data missing in query results, particularly where the queries are performed on managed data being stored on the leaf nodes 212. In some embodiments, the data accounting module 206 can account for what data elements are stored on the leaf nodes 212 and account for what data elements are stored at which of the leaf nodes 212. To account for the data elements or for which leaf nodes 212 are storing which data elements, the data accounting module 206 may maintain data accounting information regarding the storage of data elements at the leaf nodes 212. The data accounting information may be generated upon storage of data elements at the leaf nodes 212. Depending on the embodiment, the data accounting information may be generated by the data accounting module 206, by the leaf nodes 212 as they store data elements, or some combination thereof. For example, the leaf nodes 212 may individually generate data accounting information as they respectively store data elements, and provide the generated data accounting information to the data accounting module 206 for storage and subsequent use. In another example, the data accounting module 206 may generate data accounting information based on information generated and provided by the leaf nodes 212.

Based on stored data accounting information, the data accounting module 206 can estimate or otherwise detect data missing in results for queries received by the data management system 106 and handled by the query management module 208. According to some embodiments, estimating or detecting missing data for a result may involve the data management system 106 receiving an initial query for managed data stored on the leaf nodes 212. The query management module 208 may execute one or more queries, corresponding to the initial query, on the managed data stored at the leaf nodes 212. The query management module 208 may aggregate results from the leaf nodes 212, for the one or more queries, into a final result. The data accounting module 206 can query the data accounting information based on the initial query, and receive a query result describing what data should be expected in the final result when all the leaf nodes 212 are available and capable of processing the one or more queries executed on the managed data stored at the leaf nodes 212. Subsequently, the data accounting module 206 can compare the final result with the result of querying the data accounting information based on the initial query. From this comparison, the data accounting module 206 can estimate or otherwise detect data missing in the final result, which may occur when at least some of the leaf nodes 212 are unable or unavailable to be queried on the managed data they respectively store. More regarding the data accounting module 206 is discussed with respect to FIG. 4.

The query management module 208 may be configured to handle queries received by the data management system 106. In particular embodiments, the query management module 208 may be configured to execute queries on the managed data stored at the leaf nodes 212 and aggregate results from the leaf nodes 212. When executing a query, the query management module 208 may query some or all of the leaf nodes 212 for results, and may query the leaf nodes 212 irrespective of whether data relevant to the query is stored at the leaf nodes 212. In addition, the query management module 208 may be configured to adapt a query received by the data management system 106 (e.g., from a data client) to a query that is compatible with one or more of the leaf nodes 212. In some embodiments, the query submitted to the leaf nodes 212 may be similar or identical to the query received by the data management system 106. The query management module 208 may be further configured to adapt results returned by the leaf nodes 212 to a format expected by the requesting data client.

To handle querying and receiving results from the leaf nodes 212, the query management module 208 may include a query aggregation module 214 comprising one or more tiers or levels of query aggregators configured to fan-out queries until the queries reach the leaf nodes 212. As shown, the query aggregation module 214 includes a root data aggregator 224, an intermediate data aggregator 226, and a leaf data aggregator 228. It should be understood that the data management system 106 may comprise one or more root data aggregators 224, intermediate data aggregators 226, and leaf data aggregators 228. It should also be understood that the number of levels and aggregators can be more or less than what is described herein.

When the query management module 208 receives a query, that query (or one based thereon) is passed on the root data aggregator 224. The root data aggregator 224 may parse the query, validate it, and identify two or more intermediate data aggregators 226 to receive the query, thereby creating a fan-out of at least two. In turn, each of the intermediate data aggregators 226 receiving the query may identify two or more leaf data aggregators 228 for receiving the query.

Each of the leaf data aggregators 228 may be configured to submit the query received to one or more leaf nodes 212 belonging to a cluster associated with the leaf data aggregator 228. The leaf nodes 212 may return their respective query results to their respective leaf data aggregators 228, and each leaf data aggregator 228 may collect and aggregate the results from its respective leaf nodes 212. The leaf data aggregator 228 may also collect statistics on whether each of the leaf nodes 212 contained data relevant to the query (e.g., relevant table) and how much data they provided (e.g., how many data rows were provided). The leaf data aggregators 228 may return the aggregated results, and/or the statistics on information collected, to their respective intermediate data aggregators 226, which may consolidate the partial results from the leaf data aggregators 228. In accordance with some embodiments, it is not necessary that each of the leaf nodes 212 is storing managed data relevant to the query received and, as such, some or all of the leaf nodes 212 may not return a query result to their respective leaf data aggregators 228. Additionally, when some of the leaf nodes 212 are unable or unavailable to process queries from the leaf data aggregators 228 (e.g., when those leaf nodes are offline or extremely busy), the leaf data aggregators 228 may receive less data through results than would otherwise be received when the leaf nodes 212 are able or available to process queries.

Each intermediate data aggregator 226 may propagate its consolidated results to the root data aggregator 224, which in turn may compute the final results. Subsequently, the query management module 208 can provide the final results to client requesting the query. In some embodiments, this may involve the query management module 208 providing the final results to the data client module 210.

The data client module 210 may be configured to provide the data clients 108 with access to the data being managed by the data management system 106. According to some embodiments, the data client module 210 may be configured to provide the query management module 208 with queries received by the data management system 106. The data client module 210 may also be configured to receive query results from the query management module 208 and enable the query requester to access the query results.

As described herein, the data client module 210 can provide access to the data clients 108 with access through one or more various interfaces. For example, in the embodiment of FIG. 2, the data client module 216 includes a web-based interface 218, an application program interface 220, and an alert-monitor interface 222. The web-based interface 218 may include a web page through which a user may can submit queries on the managed data, and view results to queries, possibly in a selected format (e.g., list, chart, table). The application program interface 220 may permit a program operating at a data client 108 to gain access (e.g., through an application program interface) to data being managed by the data management system 106. For example, through the application program interface 220, a software tool may submit queries on the managed data directly to the data management system 106 and receive results in response. The query received through the web-based interface 218 and/or the application program interface 220 may comprise Structured Query Language (SQL) (or the like). Based on one or more user-defined or system-defined conditions, a user can elect for the data management system 106 to monitor managed data and issue alerts through the alert-monitor interface 222 when conditions are met.

Figure 3:
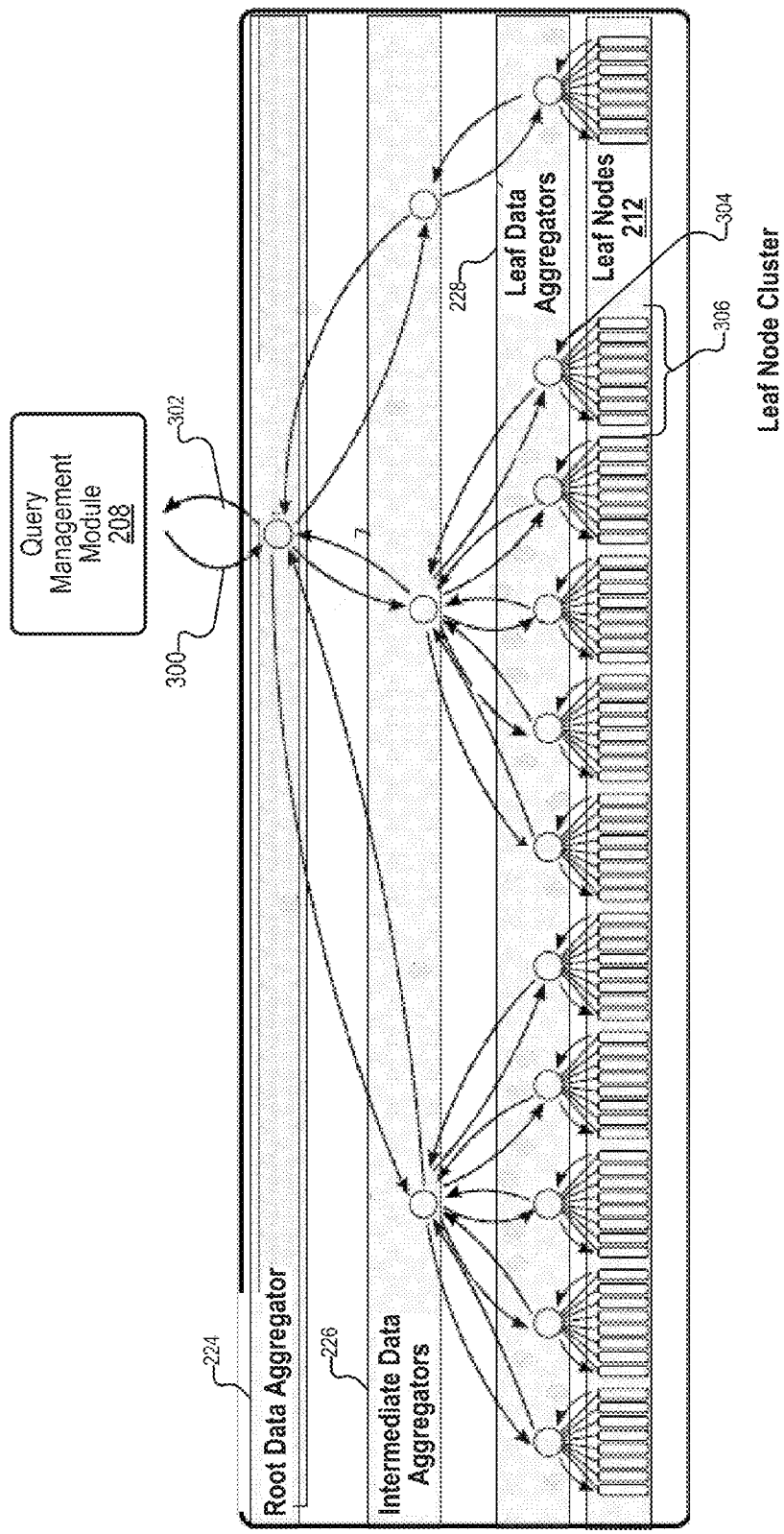
FIG. 3 illustrates an example of a data query in a data storage system in accordance with an embodiment of the invention.

FIG. 3 illustrates an example of a data query 300 in a data storage system in accordance with an embodiment of the invention. As illustrated, the example data query 300 of FIG. 3 involves the query management module 208, the root data aggregator 224, a plurality of the intermediate data aggregators 226, a plurality of the leaf data aggregators 228, and the leaf nodes 212 arranged in leaf node clusters 306. In some embodiments, each leaf node cluster 306 may have a leaf data aggregator 228 that designated or dedicated to querying one or more of the leaf nodes 212 in that cluster and collecting the corresponding results. As also illustrated, the data query propagates down from the query management module 208, to the root data aggregator 224, to the plurality of the intermediate data aggregators 226, to the plurality of the leaf data aggregators 228, and to the leaf node clusters 306. Results from one or more of the leaf nodes 212 in each of the leaf node clusters 306 are propagated up to their respective leaf data aggregator 228. From the plurality of the leaf data aggregators 228, the results continue to propagate up to the plurality of the intermediate data aggregators 226, and then the root data aggregator 224. The root data aggregator 224 provides the query management module 208 with a final result 302 based on the results provided by the one or more leaf nodes 212.

Figure 4:
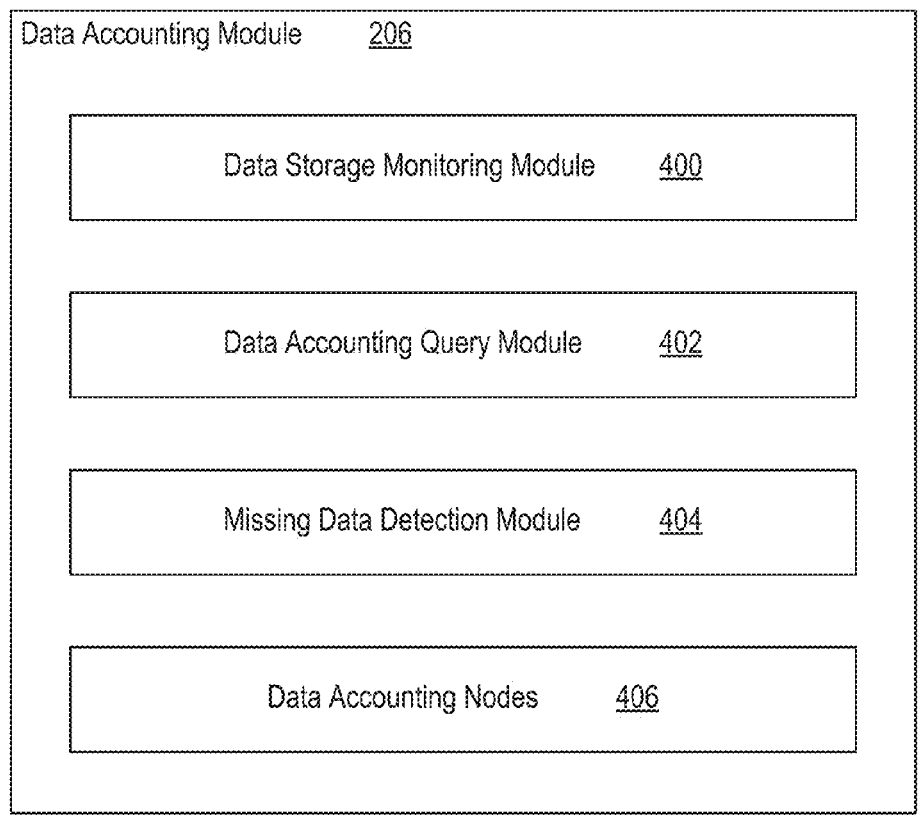
FIG. 4 illustrates an example data accounting module for detecting or estimating missing data in query results in accordance with an embodiment of the invention.

FIG. 4 illustrates the data accounting module 206 in accordance with an embodiment of the invention. As described herein, the data accounting module 206 may be configured to estimate or otherwise detect data missing in query results, particularly where the queries are performed on managed data being stored on the leaf nodes 212. In particular, the data accounting module 206 can facilitate estimating data missing in query results provided in response to queries performed on data managed by the data management system 106.

As described herein, the data storage module 204 may store the portions of a data set across one or more of the leaf nodes 212. When the data management system 106 receives a query for processing, one or more of the leaf nodes 212 may receive a corresponding (leaf-level) query for processing on the managed data they respectively store. The leaf nodes 212 may receive the queries irrespective of whether the leaf nodes 212 are storing managed data relevant to the query or the leaf node has results to provide. Query results received from the leaf nodes 212 are combined into a final query result provided in response to the original query. In the event that one or more of the leaf nodes 212 are unable or unavailable to process the query (e.g., they are offline or extremely busy), the final query result provided in response to the original query may be missing data that exists on those leaf nodes that are unable or unavailable. Accordingly, the data accounting module 206 can implement a data accounting service that monitors what managed data is being stored on the leaf nodes 212 and on which of the leaf nodes 212. In this way, the data accounting module 206 can estimate how much data is missing from a final query result when one or more of the leaf nodes 212 are unable or unavailable to process a query.

For illustrative purposes, FIG. 4 depicts the embodiment of the data accounting module 206 as including a data storage monitoring module 400, a data accounting query module 402, a missing data detection module 404, and a data accounting nodes 406. According to some embodiments, the data storage monitoring module 400 may be configured to monitor data being stored to the leaf nodes 212 and store data accounting information regarding the storage, such as the data elements being stored or the leaf nodes 212 to which the data elements are stored. Depending on the embodiment, the data accounting information may be generated by the data storage monitoring module 400, received from the leaf nodes 212 as they receive and store data elements, or some combination thereof. In some embodiments, the data storage monitoring module 400 may update data accounting information when data elements are removed from one or more of the leaf nodes 212, thereby allowing the data accounting information to remain up-to-date. For some embodiments, the data storage monitoring module 400 may store the data accounting information to one or more the data accounting nodes 406, which may be configured to store the data accounting information for subsequent query and retrieval. Such queries and retrieval of data accounting information may occur, for example, when estimating or otherwise detecting data missing in query results submitted to the data management system 106.

For example, consider where 10 data rows of log events for data table CRITICAL_EVENTS are stored on leaf node 3B of a leaf node cluster. The data storage monitoring module 400 may detect this storage event at leaf node 3B and result in related data accounting information being added to one or more of the data accounting nodes 406. For some embodiments, the data accounting information may include one or more entries where each entry comprises a table name (e.g., CRITICAL_EVENTS) and data element identifiers. The data element identifiers may include timestamps for each of the data elements, such as log event timestamps, which may be unique to log entries.

The data accounting query module 402 may be configured to perform a query on the data accounting information, where the data accounting information may be stored on at least some of the data accounting nodes 406. As described herein, the query performed by the data accounting query module 402 may be based on an initial query received by the data management system 106 to be performed on the managed data being stored on the leaf nodes 212. In some embodiments, the query performed by the data accounting query module 402 may be generated by the data accounting query module 402 upon receiving a copy of the initial query being performed on the leaf nodes 212. In some such embodiments, the copy of the initial query may be received from the query management module 208 or intercepted by the data accounting query module 402 within the data management system 106. In various embodiments, the query performed by the data accounting query module 402 may be generated by the query management module 208. For some embodiments, the query performed on the data accounting information may comprise structured query language (SQL) and may be similar to the initial query received by the data management system 106.

When performing a query on the data accounting information, the data accounting query module 402 may submit the query to be performed on one, some, or all of the data accounting nodes 406. In this way, the data accounting query module 402 can ensure that the data accounting information received or retrieved from the data accounting nodes 406 (e.g., as query results) is the latest version of the data accounting information.

According to some embodiments, some or all of the data accounting query module 402 may be implemented as part of some or all of the data accounting nodes 406, thereby allowing those data accounting nodes 406 to handle queries regarding the data accounting information directly (e.g., queries from the data clients 108 through the data client module 210).

The missing data detection module 404 may be configured to compare a query result for a query performed on managed data stored on the leaf nodes 212 (hereafter, the "managed data query result"), to a result for a query performed on the data accounting information (hereafter, the "data accounting query result"). In some embodiments, the managed data query result may be received from or otherwise provided by the query management module 208 or any of its various components. Additionally, in some embodiments, the data accounting query result may be received from or otherwise provided by the data accounting query module 402. In some embodiments, the data accounting query result may be configured to describe the managed data query result that should be expected from the query performed on the leaf nodes 212. The data accounting query result may include, for example, one or more identifiers for the data to be expected in the managed data query result, one or more identifiers for those of the leaf nodes 212 that should be contributing managed data to the managed data query result, and one or more identifiers for tables (e.g., database tables) for data that should be included in the managed data query result. The data accounting query result may also include a count of data elements (e.g., data rows) that should be expected in the managed data query result.

As described herein, comparing the data accounting query result to the managed data query result can facilitate estimation or detection of data missing in the managed data query result. In some embodiments, the comparison can provide a value representative of the amount of data missing from the managed data query result. For instance, the value may represent the amount of missing data in bytes (e.g., megabytes, gigabytes, etc.) or the number of missing data elements. Additionally, in some embodiments, the comparison can provide data elements or identifiers for data elements missing in the managed data query results. Ultimately, the result of comparing the data accounting query result to the managed data query result can be provided with the managed data query result and, in doing so, provide one of the data clients 108 with information regarding the missing data in the managed query results. For example, with the managed data query result, the data client 108 could be provided with a percentage value indicating the amount of data provided in the managed data query result versus the amount of data that should have been provided in the managed data query results (e.g., when all the leaf nodes 212 are available).

The data accounting nodes 406 may be configured to store data accounting information regarding managed data being stored across one or more of the leaf nodes 212. According some embodiments, the data accounting nodes 406 may be configured to receive data accounting information from one or more of the leaf nodes 212 as those leaf nodes receive and store managed data (e.g., log data). The data accounting information may include one or more data accounting entries that describe storage of one or more data elements to one or more of the leaf nodes 212.

Additionally, for some embodiments, the data accounting nodes 406 may be configured to be synchronized with one another such that up-to-date data accounting information is stored individually on the data accounting nodes 406. In doing so, the data accounting nodes 406 can individually process queries on the data accounting information and provide data accounting query results based on the up-to-date data accounting information. For some embodiments, the data accounting nodes 406 can facilitate synchronization of data accounting information amongst the data accounting nodes 406 by generating timestamps for each data accounting entry stored on the data accounting nodes 406 and using the generated timestamp and the entry to uniquely identify the data accounting entry amongst the data accounting nodes 406. According to some embodiments, a unique identifier for each data accounting entry may be generated by performing a hash on the generated timestamp and the entry. Each of the data accounting nodes 406 may be configured to periodically synchronize its stored data accounting information with one or more "neighboring" data accounting nodes at selected intervals (e.g., every 10 ms) using the unique identifiers associated with data accounting entries. The determination of a "neighboring" data accounting node may be based on how data accounting nodes 406 are implemented and configured with respect to one another. For example, the data accounting nodes 406 may be configured such that each of the data accounting nodes 406 has an assigned set of data accounting nodes which are considered "neighboring" data accounting nodes. An example arrangement of data accounting nodes is described herein further with respect to FIG. 6.

As used herein, each of one or more of the data accounting nodes 406 may be implemented using an independent computer system similar in architecture to the computer system 700 of FIG. 7. More regarding the computer system 700 is discussed herein with respect to FIG. 7.

Figure 5:
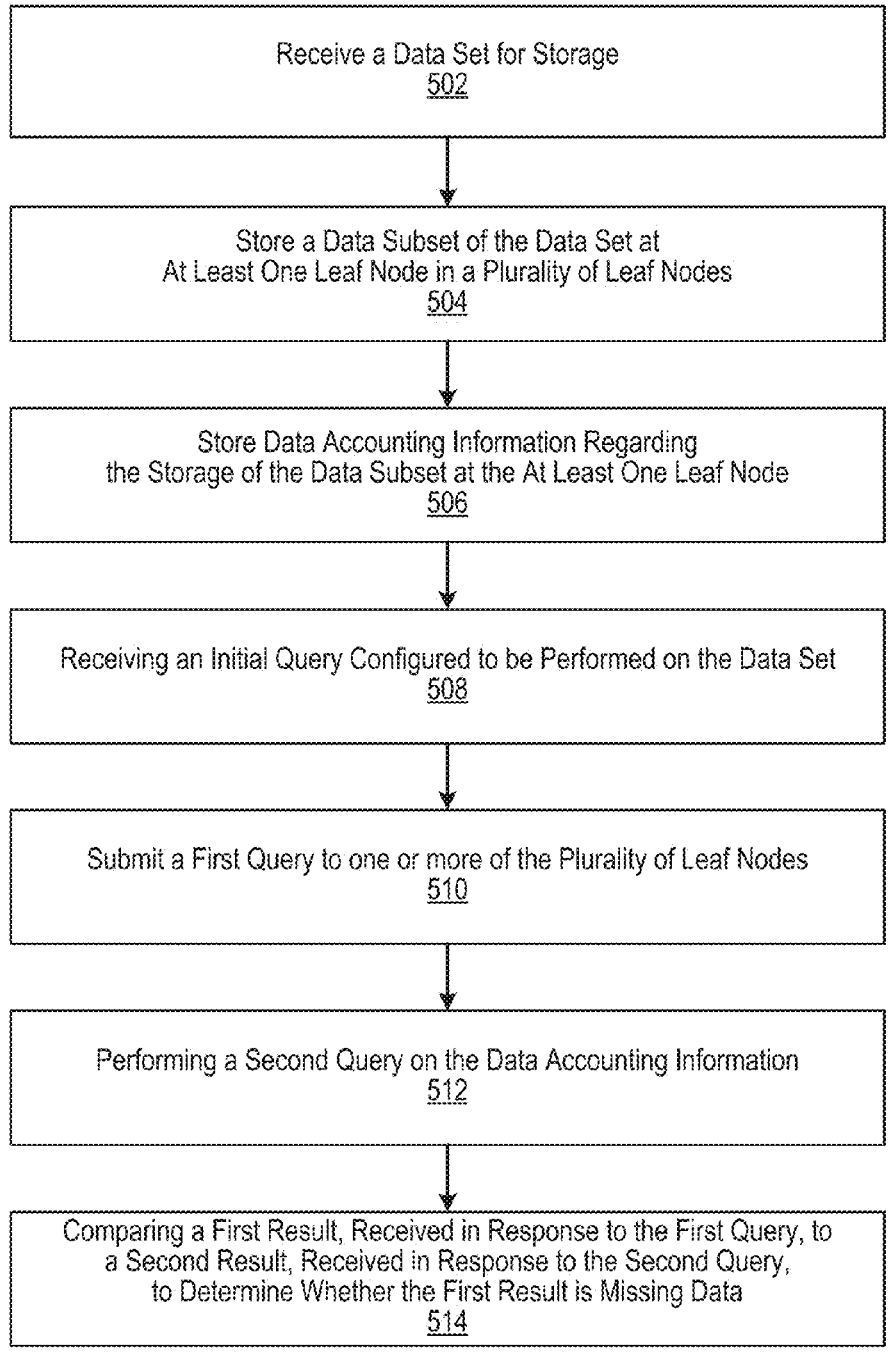
FIG. 5 illustrates an example process for detecting or estimating missing data in query results in accordance with an embodiment of the invention.

FIG. 5 illustrates an example process 500 for detecting or estimating missing data in query results in accordance with an embodiment of the invention. At block 502, a data set is received for storage. As described herein, in some embodiments, the data management system 106 may receive the data set for storage, where the data set may be provided to the data management system 106 from the data aggregation system 104. In one example, the data set received for storage may be log data including one or more log entries for events.

At block 504, a data subset of the data set is stored at at least one leaf node in a plurality of leaf nodes. In some embodiments, the data storage module 204 may store the data subset of the data set at one or more of the leaf nodes 212.

At block 506, data accounting information, regarding the storage of the data subset at the at least one leaf node, is stored. In some embodiments, the data accounting module 206 and, more particularly, the data storage monitoring module 400 can store the data accounting information. In some embodiments, the data accounting information may be stored on one or more of the data accounting nodes 406.

At block 508, an initial query, configured to be performed on the data set, is received. In some embodiments, the initial query may be one received by the data management system 106 to be performed on the managed data stored on the leaf nodes 212.

At block 510, a first query is submitted to one or more of the plurality of leaf nodes, where the first query is based on the initial query received at block 508. The first query may be configured to be performed on the managed data stored by the plurality of leaf nodes. In some embodiments, the query management module 208 may generate the first query based on the initial query and may be configured to submit the first query on data stored on the leaf nodes 212.

At block 512, a second query is performed on the data accounting information. The second query may be based on the initial query and configured to be performed on the data accounting information in regard to the initial query. In some embodiments, the data accounting query module 402 may perform the second query on the data accounting information, which may be stored on one or more of the data accounting nodes 406.

At block 514, a first result, received in response to the first query of block 510, compares a second result, received in response to the second query of block 512, to determine whether the first result is missing data. In some embodiments, the missing data detection module 404 may perform the comparison of the first result with the second result. Additionally, in some embodiments, the first result may be provided by or otherwise received from the query management module 208, while the second result is provided by or otherwise received from the data accounting query module 402. In some embodiments, the comparison results can be used by the missing data detection module 404 to estimate or otherwise detect data missing in the first result provided by the query management module 208.

Figure 6:
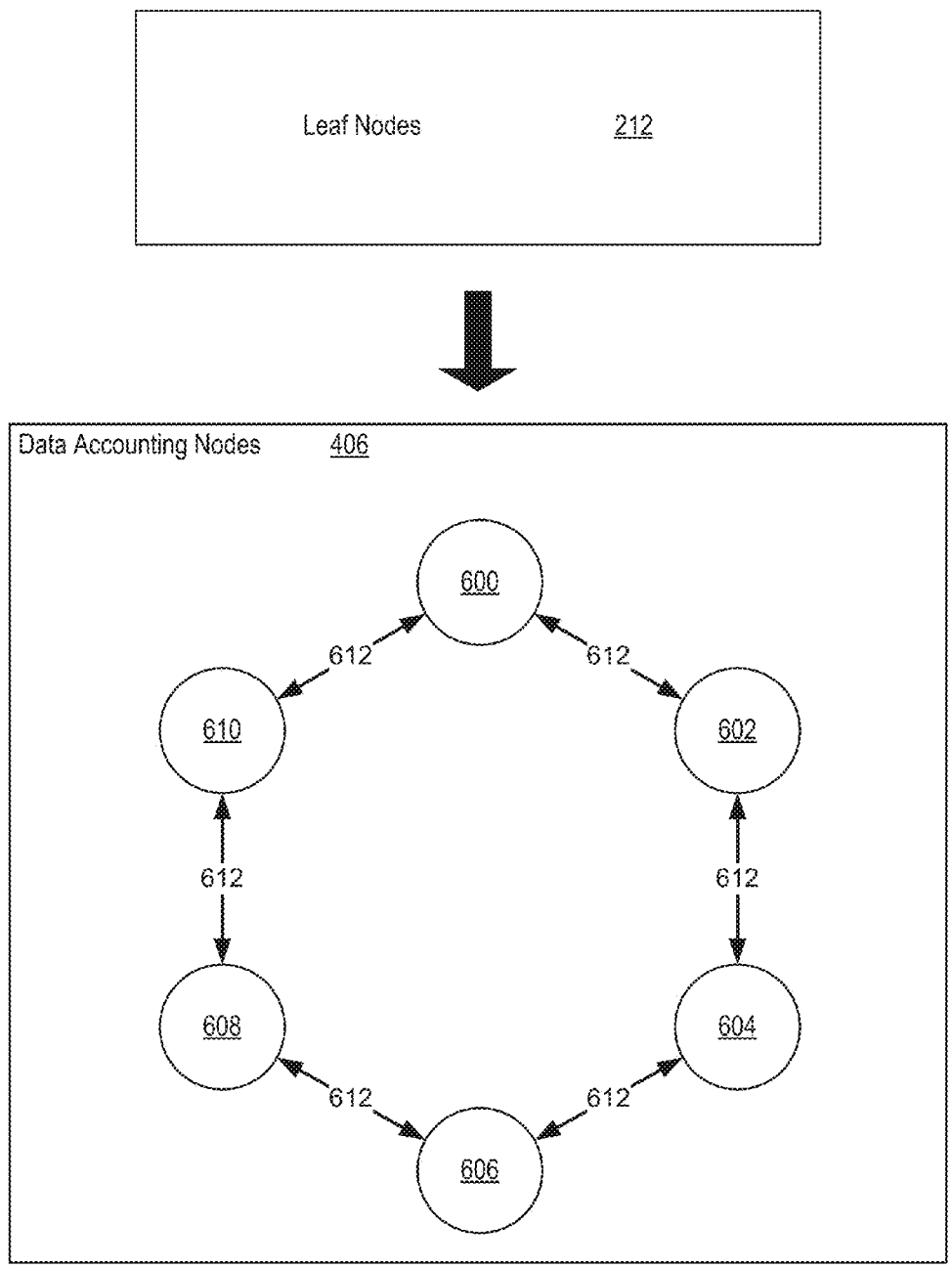
FIG. 6 illustrates an example configuration for data accounting nodes in accordance with an embodiment of the invention.

FIG. 6 illustrates an example configuration for data accounting nodes 406 in accordance with an embodiment of the invention. As described herein, the data accounting nodes 406 may be configured to receive and store data accounting information regarding data elements stored at one or more of the leaf nodes 212. As also described herein, and shown in FIG. 6, the leaf nodes 212 can directly provide the data accounting information to the data accounting nodes 406 for storage. As illustrated in FIG. 6, the data accounting nodes 406 include data accounting nodes 600 through 610. In accordance with some embodiments, the data accounting nodes 600 through 610 may be configured to be synchronized with one another such that up-to-date data accounting information is stored individually on the data accounting nodes 600 through 610. In doing so, the data accounting nodes 600 through 610 can individually process queries on the data accounting information and provide data accounting query results based on the up-to-date data accounting information. For some embodiments, each of the data accounting nodes 600 through 610 may be configured to periodically synchronize its stored data accounting information with one or more "neighboring" data accounting nodes (e.g., every 10 ms) using the unique identifiers associated with data accounting entries. The determination of a "neighboring" data accounting node may be based on how data accounting nodes 600 through 610 are implemented and configured with respect to one another. The data accounting nodes 600 through 610 may be configured such that each of the data accounting nodes 600 through 610 synchronizes its data accounting information with its assigned "neighbor" data accounting node.

In the example of FIG. 6, the data accounting node 600 is configured to synchronize 612 data accounting information with the data accounting nodes 602 and 610. The data accounting node 602 is configured to synchronize 612 data accounting information with the data accounting nodes 600 and 604. The data accounting node 604 is configured to synchronize 612 data accounting information with the data accounting nodes 602 and 606. The data accounting node 606 is configured to synchronize 612 data accounting information with the data accounting nodes 604 and 608. The data accounting node 608 is configured to synchronize 612 data accounting information with the data accounting nodes 606 and 610. The data accounting node 610 is configured to synchronize 612 data accounting information with the data accounting nodes 608 and 600. By arranging synchronization of the data accounting nodes 600 through 610 in this (or a similar) manner, the data accounting nodes 600 through 610 can allow for synchronization amongst at least some of themselves without requiring each of the data accounting nodes 600 through 610 to synchronize with all of the other data accounting nodes 600 through 610, which can pose time and computing costs. As described herein, during operation of the data accounting module 206, a given query for data accounting information may be submitted to one, some, or all of the data accounting nodes 600-610. Where more than one of the data accounting nodes 600-610 receives a given query for data accounting information, the results from those data accounting nodes can be aggregated and provided as a response to the given query. As illustrated in FIG. 6, synchronization provides a level of redundancy to optimize the return of consistent data accounting query results.

It should be understood that, in some embodiments, alternative synchronization arrangements other than the one shown may be implemented with respect to one or more of the data accounting nodes 600 through 610.

FIG. 7 is a network diagram of a system 700 for pruning data by sampling in a social networking system 730 in accordance with an embodiment of the invention. The system 700 includes one or more user devices 710, one or more external systems 720, the social networking system 730, and a network 750. For purposes of illustration, the embodiment of the system 700, shown by FIG. 7, includes a single external system 720 and a single user device 710. However, in other embodiments, the system 700 may include more user devices 710 and more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable customization of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. As described herein, the social network can be represented by a graph, i.e., a data structure including edges and nodes. Other data structures can also be used to represent the social network, including but not limited to databases, objects, classes, meta elements, files, or any other data structure.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. As discussed herein, the social networking system 730 can generate and maintain a "social graph" comprising a plurality of nodes interconnected by a plurality of edges, where each node in the social graph may represent an entity that can act on another node and/or that can be acted on by another node. The social graph may include various types of nodes, including, for example, users, non-person entities, content items, web pages, groups, activities, messages, concepts, and any other things that can be represented by an object in the social networking system 730. As noted herein, an edge between two nodes in the social graph may represent a particular kind of connection, or association, between the two nodes, which may result from node relationships or from an action that was performed by one of the nodes on the other node. As further discussed, the edges between nodes can be weighted, where the weight of an edge can represent an attribute associated with the edge, such as a strength of the connection or association between nodes. Different types of edges can be provided with different weights.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third-party. Content "items" are represented as objects in the social networking system 730.

In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, an authorization server 744, and a data processing system 746. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722*a* within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

As described above in further detail, the data processing system 746 contains logic that enables a social networking system 730 to aggregate, store, and then query event log data generated by various components of the social networking system 730. In an embodiment, the data processing system 746 may include one or more of the data sources 102, the data aggregation system 104, and the data management system 106, as discussed in more detail herein. As also described herein, event log data can relate to performance events, such as how hardware or software of a social networking system 730 is performing. Event log data can further include measures of how users interact with the social networking system 730, and information about behavioral events on the social networking system 730. Through the data processing system 746, operators of the social network system 730 can access analytics on the social networking system 730 and its various components. Such analytics can, for instance, be useful in code regression analysis, bug report monitoring, ads revenue monitoring, and performance debugging.

Figure 8:
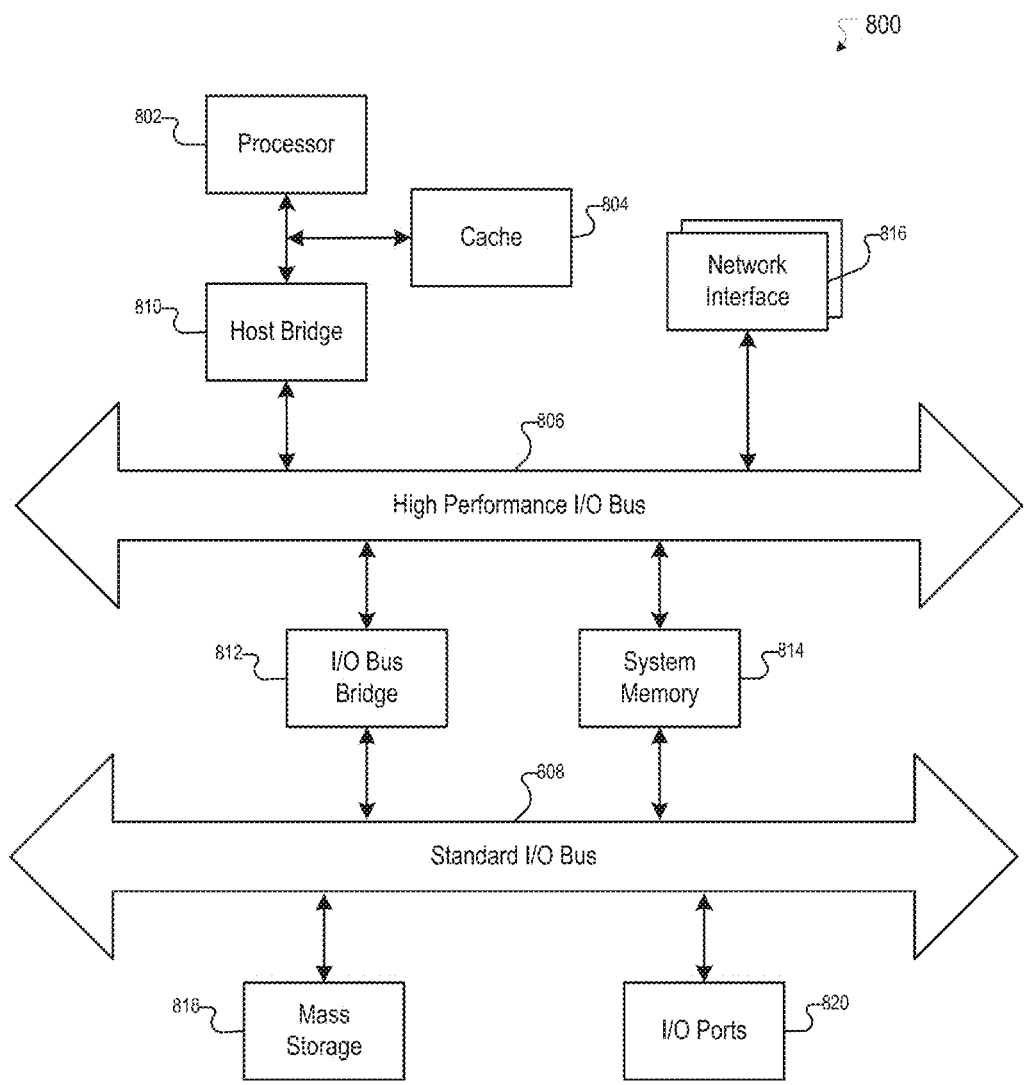
FIG. 8 illustrates a diagram of a computer system in accordance with an embodiment of the invention.

The foregoing processes and features can be implemented by a wide variety of machine and computer system architectures and in a wide variety of network and computing environments. FIG. 8 illustrates an example of a computer system 800 that may be used to implement one or more of the computing devices identified above. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be one of the data sources 102, the data aggregation system 104, the data management system 106, the data clients 108, the social networking system 730, or a component thereof. For example, each leaf node described herein (e.g., the leaf nodes 212) can be implemented by an independent computer system similar to the computer system 800. In an embodiment of the invention, the computer system 800 may be one server among many that constitutes all or part of the data management system 106.

The computer system 800 includes a processor 802, a cache memory 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples the processor 802 to the high performance I/O bus 806, whereas I/O bus bridge 812 couples the two buses 806 and 808 to each other. A system memory 814 and one or more network interfaces 816 couple to the bus 806. The computer system 800 may further include video memory and a display device coupled to the video memory (not shown). Mass storage 818 and I/O ports 820 couple to the bus 808. The computer system 800 may optionally include a keyboard and pointing device, a display device, or other input/output devices (not shown) coupled to the bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 which, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814, and then accessed and executed by processor 802. In various implementations, a module or modules can be executed by a processor or multiple processors in one or multiple locations, such as multiple servers in a parallel processing environment.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer system comprising:
   at least one processor; and
   a memory storing instructions configured to instruct the at least one processor to perform:
   receiving a data set for storage;
   storing a data subset of the data set at a set of leaf nodes of a plurality of leaf nodes;
   storing data accounting information at the set of leaf nodes, wherein the data accounting information tracks data being stored at the set of leaf nodes, wherein the data accounting information includes one or more identifiers that correspond to the data subset being stored;
   receiving an initial query configured to be performed on the data set;
   submitting a first query on the data set to the set of leaf nodes, wherein the first query is based on the initial query;
   receiving a respective first result and a respective second result in response to the first query from at least a portion of leaf nodes in the set of leaf nodes, wherein the second result is based on a second query performed on the data accounting information determined based at least in part on one or more respective identifiers that correspond to the data included in the first result, the respective second result providing data accounting info that indicates the amount of data stored in the set of leaf node based on the identifier;
   aggregating the respective first results that were received from the portion of leaf nodes to determine a final result;
   aggregating the respective second results that were received from the set of leaf nodes; and
   determining an estimate for an amount of data missing based on the aggregated second result and the final result the portion of leaf nodes to determine an estimate for an amount of data missing from the final result.

2. The computer system of claim 1, wherein a first result includes one or more query results.

3. The computer system of claim 1, wherein the data accounting information comprises storage information.

4. The computer system of claim 3, further comprising receiving the storage information from the at least one leaf node.

5. The computer system of claim 1, further comprising generating the data accounting information.

6. The computer system of claim 1, wherein the storing the data accounting information comprises storing the data accounting information at one or more data accounting nodes that are separate from the plurality of leaf nodes.

7. The computer system of claim 6, wherein the performing the second query on the data accounting information comprises:
   submitting the second query to the data accounting nodes; and
   receiving the second result from the data accounting nodes.

8. The computer system of claim 6, wherein at least a portion of the data accounting nodes are synchronized.

9. The computer system of claim 1, wherein the data accounting information further comprises an identifier for a table associated with a data element of the data subset.

10. The computer system of claim 1, wherein the data accounting information further comprises a timestamp associated with a data element of the data subset.

11. The computer system of claim 1, wherein the data set comprises log data associated with operation of a social networking system.

12. The computer system of claim 11, wherein the log data comprises one or more time-stamped data elements regarding user activity occurring on the social networking system.

13. The computer system of claim 1, wherein determining an estimate for an amount of data missing from the first result based at least in part on the second result further comprises:
   determining an estimated number of bytes missing from the first result.

14. The computer system of claim 1, wherein determining an estimate for an amount of data missing from the first result based at least in part on the second result further comprises:
   determining an estimated percentage of data missing from the first result.

15. The computer system of claim 1, wherein determining an estimate for an amount of data missing from the first result based at least in part on the second result further comprises:
determining an estimated number of data elements missing from the first result.

16. A non-transitory computer-storage medium storing computer-executable instructions that, when executed, cause a computer system to perform a computer-implemented method comprising:
receiving a data set for storage;
storing a data subset of the data set at a set of leaf nodes of a plurality of leaf nodes;
storing data accounting information at the set of leaf nodes, wherein the data accounting information tracks data being stored at the set of leaf nodes, wherein the data accounting information includes one or more identifiers that correspond to the data subset being stored;
receiving an initial query configured to be performed on the data set;
submitting a first query on the data set to the set of leaf nodes, wherein the first query is based on the initial query;
receiving a respective first result and a respective second result in response to the first query from at least a portion of leaf nodes in the set of leaf nodes, wherein the second result is based on a second query performed on the data accounting information determined based at least in part on one or more respective identifiers that correspond to the data included in the first result, the respective second result providing data accounting info that indicates the amount of data stored in the set of leaf node based on the identifier;
aggregating the respective first results that were received from the portion of leaf nodes to determine a final result;
aggregating the respective second results that were received from the set of leaf nodes; and
determining an estimate for an amount of data missing based on the aggregated second result and the final result the portion of leaf nodes to determine an estimate for an amount of data missing from the final result.

17. A computer implementing method comprising:
receiving, by a computer system, a data set for storage;
storing, by the computer system, a data subset of the data set at a set of leaf nodes of a plurality of leaf nodes;
storing, by the computer system, data accounting information at the set of leaf nodes, wherein the data accounting information tracks data being stored at the set of leaf nodes, wherein the data accounting information includes one or more identifiers that correspond to the data subset being stored;
receiving, by the computer system, an initial query configured to be performed on the data set;
submitting, by the computer system, a first query on the data set to the set of leaf nodes, wherein the first query is based on the initial query;
receiving, by the computer system, a respective first result and a respective second result in response to the first query from at least a portion of leaf nodes in the set of leaf nodes, wherein the second result is based on a second query performed on the data accounting information determined based at least in part on one or more respective identifiers that correspond to the data included in the first result, the respective second result providing data accounting info that indicates the amount of data stored in the set of leaf node based on the identifier;
aggregating, by the computer system, the respective first results that were received from the portion of leaf nodes to determine a final result;
aggregating, by the computer system, the respective second results that were received from the set of leaf nodes; and
determining, by the computer system, an estimate for an amount of data missing based on the aggregated second result and the final result the portion of leaf nodes to determine an estimate for an amount of data missing from the final result.

* * * * *